United States Patent
Frantz

(10) Patent No.: US 7,327,931 B2
(45) Date of Patent: Feb. 5, 2008

(54) ALTERNATE METHOD OF SHOWING COMMERCIALS USING PERSONAL VIDEO RECORDERS

(75) Inventor: Gene A. Frantz, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1139 days.

(21) Appl. No.: 10/141,663

(22) Filed: May 8, 2002

(65) Prior Publication Data
US 2002/0176702 A1 Nov. 28, 2002

Related U.S. Application Data

(60) Provisional application No. 60/292,763, filed on May 22, 2001.

(51) Int. Cl.
*H04N 5/76* (2006.01)
*H04N 7/00* (2006.01)
*H04N 5/445* (2006.01)

(52) U.S. Cl. .......................................... 386/46; 725/42

(58) Field of Classification Search ................. 386/46, 386/95, 125; 725/133, 153, 42
See application file for complete search history.

(56) References Cited

U.S. PATENT DOCUMENTS

| | | | | |
|---|---|---|---|---|
| 5,604,542 A | * | 2/1997 | Dedrick | 348/552 |
| 5,826,165 A | * | 10/1998 | Echeita et al. | 725/22 |
| 6,011,537 A | * | 1/2000 | Slotznick | 715/733 |
| 6,483,986 B1 | * | 11/2002 | Krapf | 386/68 |
| 6,493,038 B1 | * | 12/2002 | Singh et al. | 348/565 |
| 6,519,771 B1 | * | 2/2003 | Zenith | 725/32 |
| 6,597,405 B1 | * | 7/2003 | Iggulden | 348/553 |
| 6,698,020 B1 | * | 2/2004 | Zigmond et al. | 725/34 |
| 6,909,837 B1 | * | 6/2005 | Unger | 386/68 |
| 7,092,615 B2 | * | 8/2006 | Tanikawa et al. | 386/69 |
| 2001/0049820 A1 | * | 12/2001 | Barton | 725/32 |
| 2002/0083441 A1 | * | 6/2002 | Flickinger et al. | 725/32 |
| 2002/0100043 A1 | * | 7/2002 | Lowthert et al. | 725/36 |
| 2002/0144262 A1 | * | 10/2002 | Plotnick et al. | 725/32 |
| 2003/0037330 A1 | * | 2/2003 | Makofka | 725/32 |
| 2005/0076359 A1 | * | 4/2005 | Pierson et al. | 725/32 |

* cited by examiner

*Primary Examiner*—Thai Q. Tran
*Assistant Examiner*—Gelek Topgyal
(74) *Attorney, Agent, or Firm*—Robert D. Marshall, Jr.; W. James Brady; Frederick J. Telecky, Jr.

(57) ABSTRACT

A recording and playback system comprising a personal video recorder ("PVR") coupled to a television monitor. The PVR records a video broadcast stream which comprises main program information as well as commercial content. The commercial content includes commercial identifier values which indicate to the PVR the presence of commercial content. Thus, during playback on the monitor, the PVR monitors the recorded broadcast stream for the commercial identifiers to determine the presence of commercial content. A user can control the PVR to play back the recorded stream in a conventional manner in which commercials interrupt the main program information. Alternatively, the user can cause the PVR to play back the recorded broadcast stream in an alternate format in which the main program information continues to play concurrently with the commercial content.

26 Claims, 2 Drawing Sheets

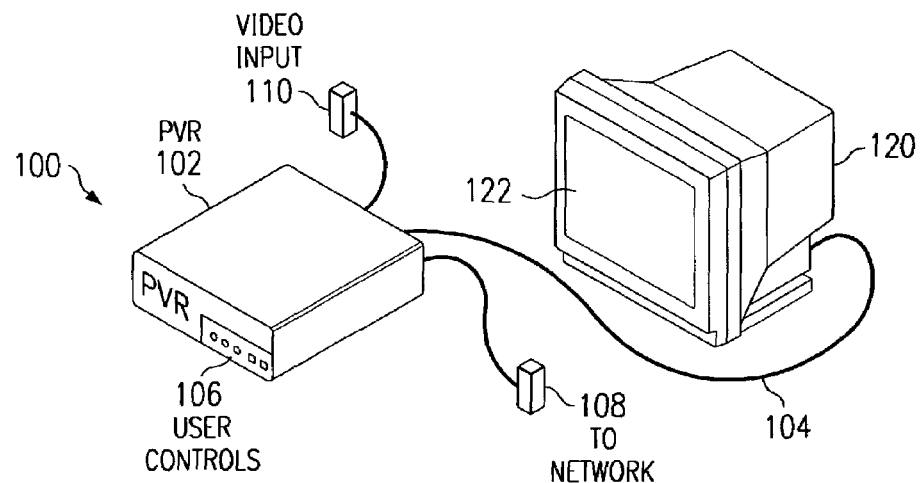
FIG. 1
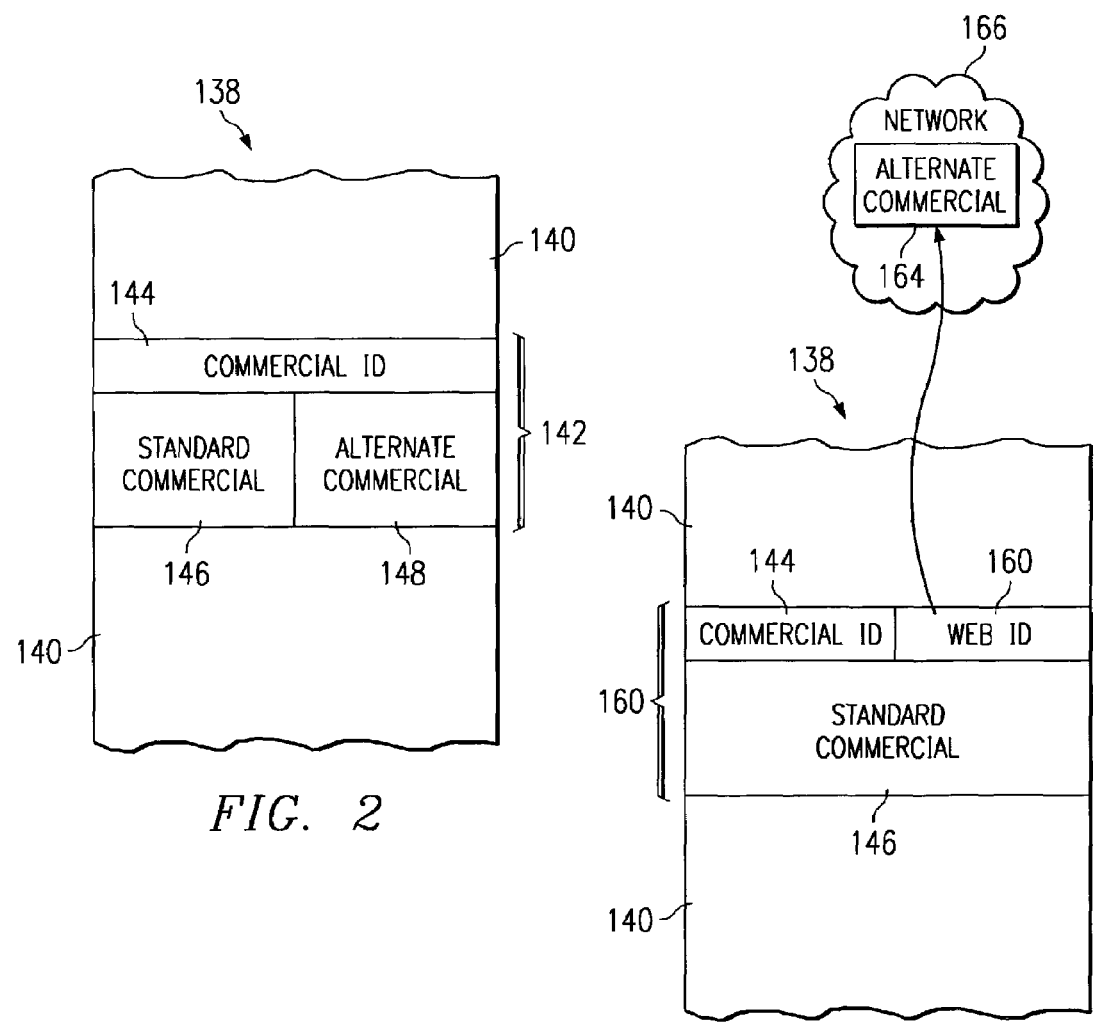
FIG. 2
FIG. 5

ALTERNATE METHOD OF SHOWING COMMERCIALS USING PERSONAL VIDEO RECORDERS

CROSS-REFERENCE TO RELATED APPLICATIONS

This application claims priority under 35 USC §119(e)(1) of Provisional Application No. 60/292,763, filed May 22, 2001.

STATEMENT REGARDING FEDERALLY SPONSORED RESEARCH OR DEVELOPMENT

Not applicable.

BACKGROUND OF THE INVENTION

1. Field of the Invention

The present invention relates generally to a method of showing commercials or other forms of information on a television monitor without interrupting the main program being shown. More particularly, the invention relates to recording a video broadcast stream, and during playback of the recorded broadcast showing commercials on the monitor concurrently with the main program.

2. Background of the Invention

Since its inception network television has been free to viewers. Instead of viewers paying for the broadcasts, advertising provides much of the networks' revenue. To a large extent, the price the advertisers pay to have the networks air commercials is determined by the expected number of people that will likely watch the commercial. Thus, to increase advertising revenue and exposure to the advertised product, networks and advertisers strongly desire for as many viewers as possible to watch the commercials. As is well known, commercials interrupt the main program being broadcast and do so fairly frequently. A significant portion of the viewing audience, however, would rather view the main program without interruptions. Thus, a tension exists between the networks and advertisers who want viewers to watch the commercials and the viewers who would rather the main programming not be interrupted with commercials. A solution to this problem is highly desirable.

BRIEF SUMMARY OF THE INVENTION

The deficiencies of the prior art described above are solved in large part by a recording and playback system, and associated method, comprising a personal video recorder ("PVR") coupled to a television monitor. The PVR records a video broadcast stream which comprises main program information (e.g., a television show, movie, sporting event) as well as commercial content. The commercial content includes commercial identifier values which indicate to the PVR the presence of commercial content. During playback on the monitor, the PVR monitors the recorded broadcast stream for the commercial identifiers to detect the presence of commercial content. A user can control the PVR to play back the recorded stream in a conventional manner in which commercials interrupt the main program information. Alternatively, the user can cause the PVR to play back the commercial content in an alternate format in which the main program information continues to play concurrently with the commercial content.

In one embodiment, the recorded commercial content includes a standard commercial format and an alternate commercial format. In another embodiment, the recorded commercial content includes a standard commercial format and a web page identifier which indicates to the PVR the location on a network (e.g., the Internet) from which to retrieve alternate commercial content.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a detailed description of the preferred embodiments of the invention, reference will now be made to the accompanying drawings in which:

FIG. 1 shows the preferred embodiment of a digital recording and playback system including a personal video recorder and a television monitor;

FIG. 2 conceptually shows the use of a commercial identifier in a broadcast stream to identify commercial content;

FIG. 5 shows an alternative embodiment to that of FIG. 2 in which the commercial content includes a web page identifier.

NOTATION AND NOMENCLATURE

Figure 3A:
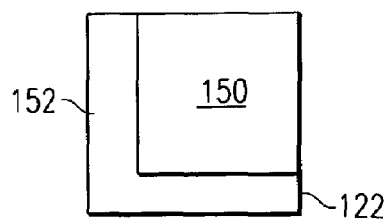
FIGS. 3A-3D show various embodiments of how commercial content can be shown concurrently with a main program on a television screen.
Figure 3C:
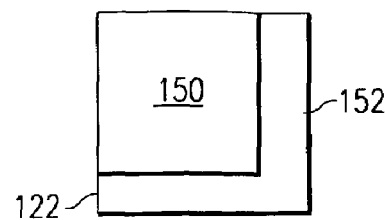
Figure 3B:
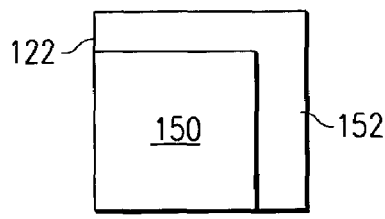
Figure 3D:
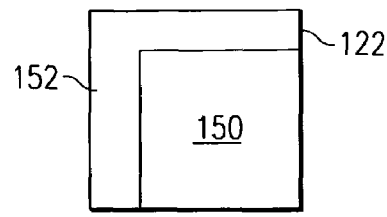

Certain terms are used throughout the following description and claims to refer to particular system components. As one skilled in the art will appreciate, computer companies may refer to a component by different names. This document does not attempt to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "commercial" refers to that portion of a video broadcast stream that contains information on behalf of advertisers, television network companies, or other such entities. The term "main program" refers to that portion of the broadcast stream that is not commercial content. A main program includes movies, shows, sporting events, news broadcasts, documentaries, and other such content. The term "concurrently" includes, but is not limited to, "simultaneously." Thus, two events that stop and start at the same time are concurrent. Two overlapping events that stop and start at different times are also concurrent.

DETAILED DESCRIPTION OF THE PREFERRED EMBODIMENTS

The problem described above regarding the divergent desires of viewers and network broadcasters/advertisers is solved using a digital television recording and playback device that records a broadcast stream and plays back the broadcast stream on a television monitor with commercials shown concurrently with the main program itself. In this way, the main program is not interrupted, yet the commercial content is also presented to the viewer. The viewer can decide how the commercials recorded with the broadcast stream are to be shown during playback. In general, the recording and playback device can substantially continuously (i.e., substantially without interruption) show the program on the television while commercials are shown in pre-selected or programmed areas of the television screen concurrent with the main program.

Referring to FIG. 1, a video system 100, constructed in accordance with the preferred embodiment of the invention, generally includes a personal video recorder ("PVR") 102 coupled to a television monitor 120 via a cable 104 which couples a video output interface (not shown) to the monitor. As is well-known in the art, PVRs can record programming in a digital format in memory internal to the device. The PVR 102 includes a processor coupled to the memory and executes software stored in the device (e.g., in a read only memory or "ROM"). Like a video cassette recorder ("VCR"), a PVR permits a viewer to play, pause, rewind, and fast forward through a recorded program. A PVR also permits slow motion viewing and even frame-by-frame advancing and reversing through the digitally recorded program. PVR 102 in the preferred embodiment may be any suitable PVR now available or later developed that has been modified to include the functionality described herein. Such functionality may be implemented in the form of software executed by the PVR's processor. Implementing such functionality in software would be well within the abilities of one of ordinary skill in the art upon reading the following description. Suitable PVRs commercially available include PVRs currently provided by Sony, Microsoft or ReplyTV. The software in such PVRs could readily be modified to implement the functionality described herein.

The PVR 102 preferably includes user controls 106 on its front face which permit a user to perform various functions such as record, play, fast forward, and the like. User controls may also be provided in the form of a remote control with an infra-red ("IR") communication link to the PVR. The PVR 102 can be connected to a network, such as the Internet, via cable 108. A video input interface 110 is also provided which permits the PVR 102 to receive video (and audio) input signals from a conventional television antenna, cable, VCR, or any other form of video information.

The television monitor 120 may be any type of television set now known or later developed including, without limitation, conventional television sets and high definition television sets. As shown, the television monitor 120 includes a screen 122 which may have any height-to-width ratio desired.

In accordance with the preferred embodiment of the invention, via user controls 106, a user records a video broadcast stream which includes main programming and commercial content. During playback of the recorded broadcast stream, as explained below, the PVR 102 detects the presence of commercial content and differentiates the commercials from the programs. Then, in any one of variety of formats and variations, PVR 102 concurrently plays the commercials and the main program on the screen 122. FIG. 2 illustrates conceptually how the PVR 102 differentiates a commercial from a program. In FIG. 2, a portion 138 of recorded broadcast stream is shown. The portion 138 shown includes two portions of a main program 140 interrupted by commercial content 142. Preferably at or near its beginning, commercial content 142 includes a commercial identifier 144. This identifier indicates to PVR 102 that the video segment associated with the identifier includes one or more commercials. The identifier may be a signal or data value of any type, length or format which performs the function noted above. For example, the commercial identifier 144 may be a predetermined binary value. If desired, the identifier may also indicate the length of the commercial or commercials which follow. Such length may be identified by number of bytes if the broadcast stream is a binary sequence of values, time, or in any other suitable manner. Alternatively, another value (not shown) can be included at the end of the commercial(s) to mark the end of the commercial.

Alternatively, the commercial content in a broadcast stream can be identified without the use of an explicit identifier 144. For example, the commercial content can be identified "passively" such as by a change in volume level (e.g., commercial audio increases in sound level) or by a predetermined relatively short duration video pattern (e.g., a momentary black video frame). One of ordinary skill in the art will recognize many other ways to passively identify commercial content to a PVR.

Referring still to FIG. 2, the commercial content 142 preferably includes a "standard" commercial video portion 146 and an alternate commercial video portion 148 provided, for example, on separate channels in the broadcast stream 138. Alternatively, the commercial portions 146, 148 can be provided sequentially. Further still, the alternate commercial portion 148 could be "embedded" in the same channel as the standard portion 146 or could be included in a "blanking area" in the broadcast steam. The standard commercial portion 146 causes the PVR 102 to show the commercial in a full screen format in accordance with conventional television programming. That is, the main program 140 ceases while the standard commercial 146 plays. After the commercial 146 is completed, the program 140 continues.

If, however, the PVR 102 reads or otherwise detects the commercial identifier 144, then the PVR shows the alternate commercial portion 148 on the television screen 122. In accordance with the preferred embodiment, the alternate commercial portion 148 is shown concurrently with the main program 140 which preferably does not cease playing. Any of a variety of suitable techniques for playing both the alternate commercial portion 148 and the main program 140 are acceptable. FIGS. 3A-3D and 4A-4B show several exemplary techniques.

Figure 4A:
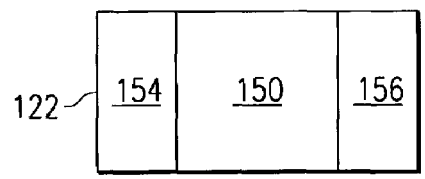
FIGS. 4A-4B show additional embodiments of how commercial content can be shown concurrently with a main program on a television screen.
Figure 4B:
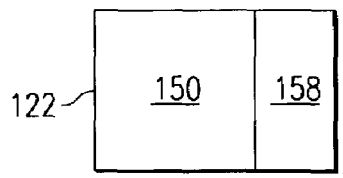

In FIGS. 3A-3D, the PVR 102 divides the screen 122 into two fields 150 and 152 with field 150 used to show the main program 140 and field 152 used for the alternate commercial portion 148. As shown, field 150 may be a reduced version of the full screen and its aspect ratio (ratio of height to width) may be the same as for the fully screen. Conventional techniques exist to scale the main field from a full screen window to any desired size. In general, field 150 preferably comprises a quadrangle. Field 152 preferably is an "L-shaped" window which borders field 150 on the bottom and to the left as in FIG. 3A. Alternately, L-shaped field 152 may be shown in other regions of screen 122 if desired such as those shown in FIGS. 3B-3D. Further, the field used for the alternate commercial 148 need not be L-shaped as shown in FIGS. 3A-3D. FIG. 4A, for example, illustrates screen 122 divided into three regions. The center region 150 is used to show the main program 140. Side regions 154 and 156 can be used to show the alternate commercial portion 148. Further still, the screen 122 can be divided into two regions as in FIG. 4B. Region 150 may be used to show the main program 140 while region 158 is used for the alternate commercial portion 148.

The relative sizes and shapes of the fields used for the alternate commercial portion 148 can be varied in any desired fashion. The embodiments shown in FIGS. 3A-3D and 4A-4B are exemplary only. The alternate commercial portion 148 contains video especially formatted for showing on screen 122 in a non-conventional format, such as that shown in FIGS. 3A-3D and 4A-4B, while the main program 140 concurrently is shown on screen 122. Preferably only the sound associated with the main program 140 is played on television monitor 120 or speakers connected to it. If desired, the user can use controls 106 to cause the PVR to play sound associated with the main program 140, commercial 148, or both.

FIG. 5 shows an alternative embodiment in which commercial content 160 includes a commercial identifier 144, such as that described above, a web page identifier 162 and a standard commercial portion 146. Noticeably absent, relative to the embodiment of FIG. 2, is the alternate commercial portion 148. Instead, the commercial segment 160 includes a web page identifier 162 which identifies or is used to identify a web page on a network 166 (e.g., the Internet). The web page identifier 162 may be a Universal Resource Locator ("URL") or Internet Protocol ("IP") address. The web page identifier 162 provides an indication to the PVR 102 as to where to find an alternate commercial portion 164 on the network. Thus, rather than including the alternate commercial portion in the transmitted broadcast stream 138 itself as in FIG. 2, the broadcast stream 138 includes a mechanism for the PVR 102 to use to retrieve the alternate commercial portion from another location. Once retrieved in this manner, the PVR 102 may show the alternate commercial portion 164 on screen 122 in a format, such as that of FIG. 3 or 4, and concurrently with the main program 140. The alternate commercial portion retrieved from the network or included in the broadcast stream can be a single frame of video, a motion sequence, or even a segment that is interactive with the user via, for example, controls 106. Further, if desired, both an alternate commercial portion and a web page identifier can be included in the broadcast stream and either technique can be selected for showing commercials concurrently with main programming. The user can make this selection via controls 106 or the PVR 102 can be preset for either technique.

As an additional embodiment, the PVR 102 may download alternate commercial content from the web at a different time than when the commercials are to be shown. For example, the PVR 102 may access the web in the middle of the night to download alternate commercial content. Then, during the day when the broadcast stream is received, the alternate commercial portions are already available in the PVR and need not be included in the broadcast stream. This and other embodiments described herein also permit the alternate commercial content to be customized to the individual viewer. A website can identify the viewer via the PVR's IP address or other suitable means and provide customized content according to information stored at a website associated with that viewer.

Figure 6:
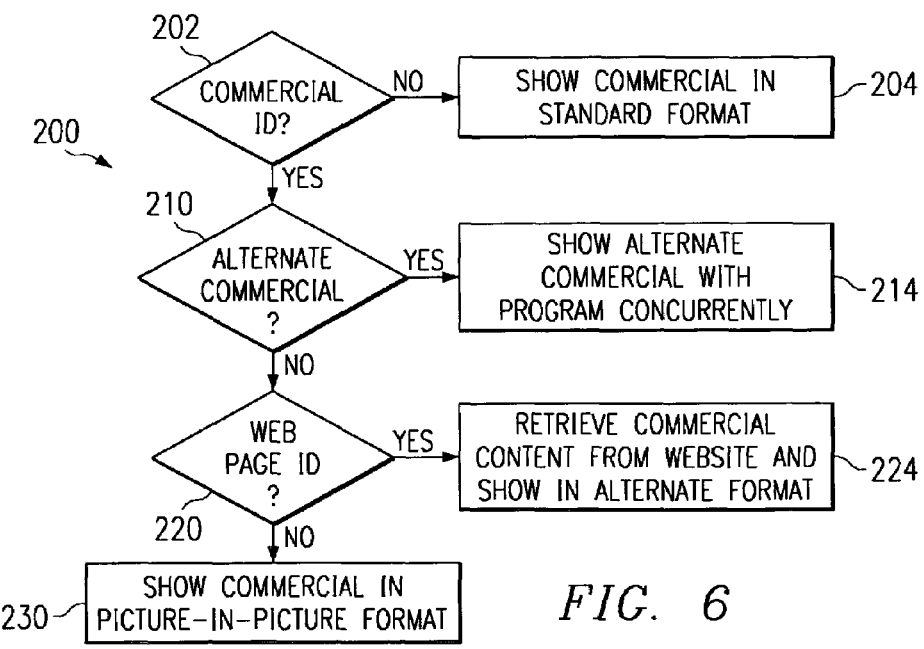
FIG. 6 shows a preferred operation of a personal video recorder in accordance with the preferred embodiment of the invention.

The method 200 of FIG. 6 illustrates the operation of PVR 102 with the capability disclosed herein. In step 202, the PVR 102 determines whether a commercial identifier is present at or near the beginning of a commercial. If the determination is no, then the commercial is shown in a standard format (i.e., cessation of the main program and a full screen presentation of the commercial). If a commercial identifier is present, however, then the PVR 102 determines whether an alternate commercial portion is present as part of the transmitted commercial content (step 210). If the alternate commercial portion is present, then in step 214 the PVR shows the alternate commercial portion concurrently with the main program. The memory in the PVR which stores the broadcast stream preferably is fast enough to enable recall of both the main program and the alternate commercial portion and assembly into the desired screen format. If no alternate commercial portion is present, the PVR determines (step 220) whether a web page identifier is present. If such an identifier is present, then in step 224, the PVR 102 retrieves the alternate commercial content from the web site identified by the web page identifier and shows the content concurrently with the main program. Lastly, if a commercial identifier is present (step 202), but neither an alternate commercial portion or a web page identifier is present (steps 210, 220), then in step 230, the standard commercial is shown as a "picture-in-picture" format with the main program, according to known techniques.

It should be recognized that, rather than prerecording an entire broadcast stream and then playing it back, the broadcast stream can be shown on monitor 122 with a time delay of suitable length to permit the commercials to be played concurrently with the main program. The PVR's processor stores the broadcast stream, or at least a part of the stream, in internal memory and plays back the stream from memory. The internal memory, in the form of a first-in-first-out ("FIFO") buffer, preferably has enough capacity to implement a desired time delay. For example, if a 10 minute time delay is desired, the PVR's memory preferably can store 10 minutes worth of the broadcast stream. Being able to buffer 10 minutes of the broadcast permits the PVR to play back the broadcast with a 10 minute delay. Alternatively, the user can introduce a time delay by simply pausing the video for a desired amount of time. Preferably, the time delay is at least as long as the length of a commercial. As such, when a commercial is encountered, the PVR 102 can play both the commercial and the program. This permits, in effect, live broadcasts (albeit with a time delay) to be shown without commercial interruptions as described previously.

The embodiments described above permit standard commercials to be shown interrupting a main program or alternate commercials to be shown concurrently with a main program. The user can select either mode of operation via controls 106 (or a remote control). Alternatively, the commercial content providers may dictate how the commercials are to be shown. For example, a code could be included in the commercial content, as part of the commercial identifier or separately, which indicates to the PVR whether to play standard or alternate commercials. Further, the PVR could be preset to always play alternate commercials concurrently with main programming whenever the alternate programs are present in the broadcast stream.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video playback system, comprising:
a personal video recorder including user input controls which permit a user to control the operation of the personal video recorder; and
a television monitor coupled to said personal video recorder;
wherein said personal video recorder plays back a previously recorded broadcast stream on said television monitor, said previously recorded broadcast stream includes a main program and commercial content, said commercial content includes a commercial identifier, a standard commercial portion and an alternate commercial portion, wherein said personal video recorder plays back said main program on said television monitor in the absence of a commercial identifier, and wherein upon detection of a commercial identifier a user can select whether the personal video recorder plays back said standard commercial portion instead of said main program on said television monitor or plays back said alternate commercial portion concurrently with said main program on said television monitor.

2. The video playback system of claim 1 wherein:
upon detection of a commercial identifier and user selection of playing back said alternate commercial portion concurrently with said main program showing said main program in a first field of said television monitor and showing said alternate commercial portion in a second field of said television monitor.

3. The video playback system of claim 2 wherein said first field comprises a quadrangle and said second field comprises an L-shaped region abutting said quadrangle.

4. The video playback system of claim 2 wherein said first field comprises a center quadrangle on said television monitor and said second field comprises divided quadrangles on either side of said center quadrangle.

5. The video playback system of claim 1 wherein:
upon detection of a commercial identifier and user selection of playing back said alternate commercial portion concurrently with said main program the personal video recorder causes sound associated only with said main program to be heard.

6. The video playback system of claim 1 wherein:
upon detection of a commercial identifier and user selection of playing back said alternate commercial portion concurrently with said main program the personal video recorder causes sound associated only with said alternate commercial portion to be heard.

7. A video system, comprising:
a personal video recorder including user input controls which permit a user to control the operation of the personal video recorder;
a television monitor coupled to said personal video recorder; and
a network connection coupled to said personal video recorder;
wherein said personal video recorder plays back previously recorded programming on said television monitor, said previously recorded programming includes a main program and commercial content, said commercial content includes a commercial identifier, a standard commercial portion and a web page identifier, wherein said personal video recorder plays back said main program on said television monitor in the absence of a commercial identifier, and wherein upon detection of a commercial identifier a user can select whether the personal video recorder plays back said the standard commercial portion instead of said main program on said television monitor or plays back an alternate commercial portion downloaded from a network from a location corresponding to said web page identifier concurrently with said main program on said television monitor.

8. The video playback system of claim 7 wherein:
upon detection of a commercial identifier and user selection of playing back said alternate commercial portion concurrently with said main program showing said main program in a first field on said television monitor and showing said alternate commercial portion in a second field on said television monitor.

9. The video playback system of claim 8 wherein said first field comprises a quadrangle and said second field comprises an L-shaped portion abutting said quadrangle.

10. The video playback system of claim 8 wherein said first field comprises a center quadrangle on said television monitor and said second field comprises divided quadrangles on either side of said first region.

11. The video playback system of claim 7 further including a network interface and wherein said alternate commercial portion is downloaded to said video playback system at a different time than said alternate commercial portion is shown on said television monitor.

12. The video playback system of claim 7 wherein:
upon detection of a commercial identifier and user selection of playing back said alternate commercial portion concurrently with said main program the personal video recorder causes sound associated only with said main program to be heard.

13. The video playback system of claim 7 wherein:
upon detection of a commercial identifier and user selection of playing back said alternate commercial portion concurrently with said main program the personal video recorder causes sound associated only with said alternate commercial portion to be heard.

14. A method for showing commercial content while showing main program information, comprising;
(a) recording a broadcast video stream comprising main program information and commercial content, said commercial content including a commercial identifier value, a standard commercial portion and an alternate commercial portion;
(b) playing back said recorded broadcast stream on a television screen;
(c) while playing back said recorded broadcast stream, examining the recorded stream for commercial identifier values;
(d) in the absence of a commercial identifier playing back the main program information;
(e) upon detection of a commercial identifier in a standard commercial user selected mode playing back the standard commercial portion instead of the main program information; and
(f) upon detection of a commercial identifier in an alternate commercial user selected mode playing back the alternate commercial portion concurrently with the main program information.

15. The method of claim 14, wherein:
said step of playing back the alternate commercial concurrently with the main program information includes showing the alternate commercial portion on a first portion of said television screen while showing the main program information on a second portion of said television screen.

16. The method of claim 15, wherein:

said second portion of said television screen comprises a quadrangle and said first portion of said television screen comprises an L-shaped region abutting said quadrangle.

17. The method of claim 15, wherein:

said second portion of said television screen comprises a center quadrangle on said television monitor and said first portion of said television screen comprises divided quadrangles on either side of said center quadrangle.

18. The method of claim 14, wherein:

said step of said step of playing back the alternate commercial concurrently with the main program information includes causing sound associated only with the main program information to be heard.

19. The method of claim 14, wherein:

said step of said step of playing back the alternate commercial concurrently with the main program information includes causing sound associated only with the alternate commercial portion to be heard.

20. A method for showing commercial content while showing main program information, comprising;

(a) recording a broadcast video stream comprising main program information and commercial content, said commercial content including a commercial identifier value, a standard commercial portion and a web page identifier portion;

(b) playing back said recorded broadcast stream on a television screen;

(c) while playing back said recorded broadcast stream, examining the recorded stream for commercial identifier values;

(d) in the absence of a commercial identifier playing back the main program information;

(e) upon detection of a commercial identifier in a standard commercial user selected mode playing back the standard commercial portion instead of the main program information; and (f) upon detection of a commercial identifier in an alternate commercial mode playing back an alternate commercial portion downloaded from a network at a location corresponding to said web page identifier concurrently with the main program information.

21. The method of claim 20, wherein:

said step of playing back the alternate commercial concurrently with the main program information includes showing the alternate commercial portion on a first portion of said television screen while showing the main program information on a second portion of said television screen.

22. The method of claim 21, wherein:

said second portion of said television screen comprises a quadrangle and said first portion of said television screen comprises an L-shaped region abutting said quadrangle.

23. The method of claim 21, wherein:

said second portion of said television screen comprises a center quadrangle on said television monitor and said first portion of said television screen comprises divided quadrangles on either side of said center quadrangle.

24. The method of claim 20, wherein:

said step of said step of playing back the alternate commercial concurrently with the main program information includes causing sound associated only with the main program information to be heard.

25. The method of claim 20, wherein:

said step of said step of playing back the alternate commercial concurrently with the main program information includes causing sound associated only with the alternate commercial portion to be heard.

26. The method of claim 20 further including the step of:

(g) downloading said alternate commercial portion at a different time than playing back said alternate commercial portion.

* * * * *